May 3, 1927.

T. FRANKS 1,627,430

COUPLING FOR VEHICLES

Filed Aug. 24, 1926    2 Sheets-Sheet 1

May 3, 1927. 1,627,430
T. FRANKS
COUPLING FOR VEHICLES
Filed Aug. 24, 1926　2 Sheets-Sheet 2

Inventor
Thomas Franks
By
B. Singer, atty

Patented May 3, 1927.

1,627,430

UNITED STATES PATENT OFFICE.

THOMAS FRANKS, OF WALSALL, ENGLAND.

COUPLING FOR VEHICLES.

Application filed August 24, 1926, Serial No. 131,277, and in Great Britain June 11, 1926.

This invention relates to couplings for vehicles and is applicable to vehicles generally, being primarily intended for colliery tubs or coal wagons.

The object of the present invention is to provide a generally improved coupling which will allow of the vehicles being safely uncoupled while in motion, and which will leave the mouth of the coupling hook open until the link of a coupling chain or its equivalent is again placed in the mouth of the hook, the complete uncoupling action being effected by a single movement of a control disposed for operation from the side of the vehicle.

Referring to the drawings:—

Figure 1:
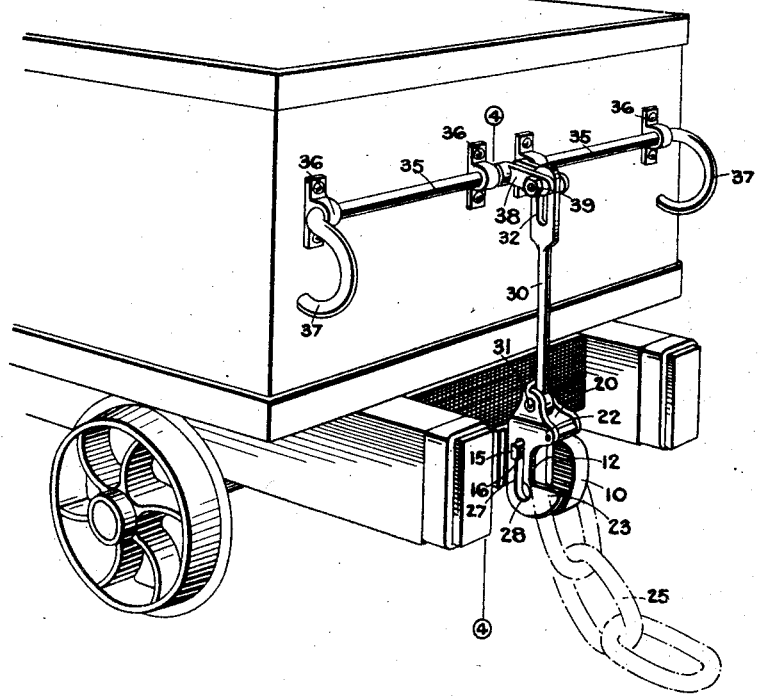
Figure 1 is a perspective view showing coupling mechanism made in accordance with this invention in the locked position.
Figure 2:
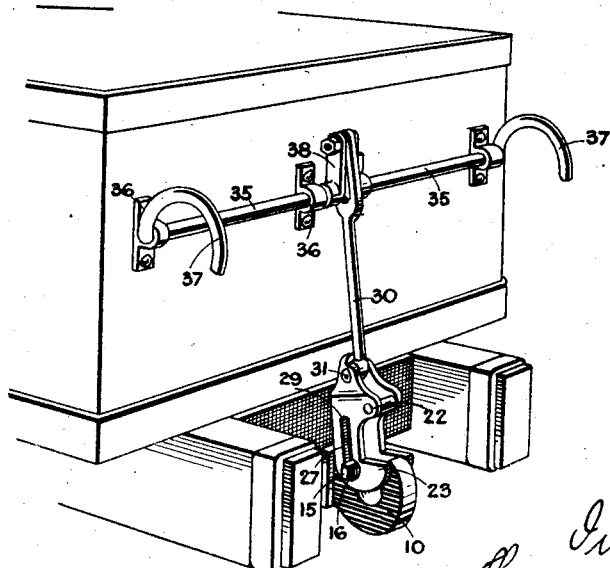
Figure 2 is a similar view showing the locking member in the lifted, but not tilted, position.
Figure 3:
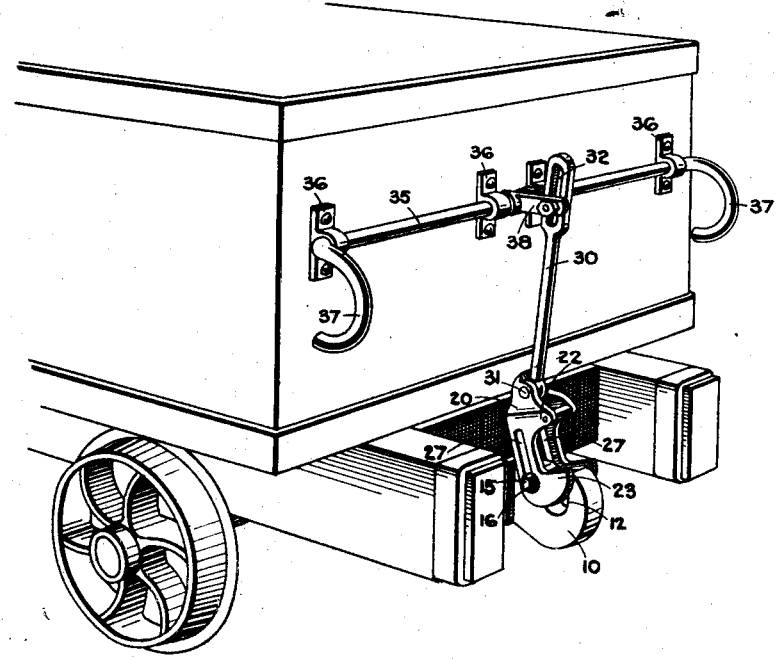
Figure 3 is a corresponding view showing the locking member in the tilted or fully released position.
Figure 4:
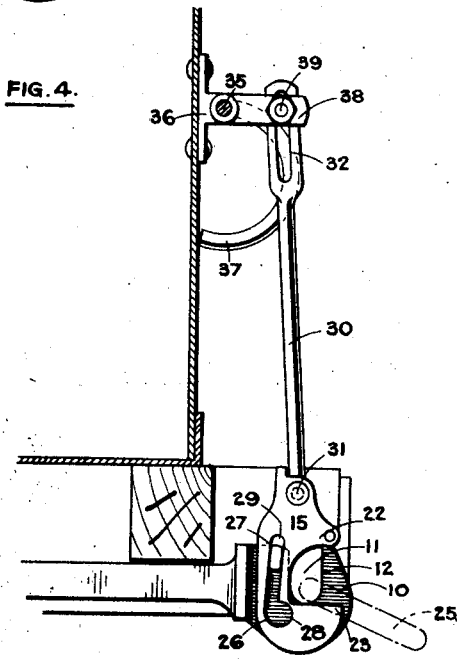
Figure 4 is a part sectional elevation on line 4—4 of Figure 1.

In the construction illustrated the coupling hook 10 has its opening 11 arranged in its upper edge, the side 12 of the opening near the point of the hook being substantially vertical.

The coupling hook is provided with a flat sided pin 15. Arranged with its flat sides 16 slightly tilted to the vertical, the upper part of the pin being tilted forwardly away from the vehicle. The pin projects from both sides of the hook.

The locking member 20 is in the form of a stirrup and engages on either side of the hook.

This locking member is provided with an opening in its forward edge and has upper and lower jaws 22 and 23 respectively above and beneath the opening, the upper jaws 22 serving to lock the opening 11 of the hook, and the lower jaws 23 receiving the coupling link or member 25.

The stirrup like portion or back 26 of the locking member is provided with keyhole shaped slots 27 at either side engaging with the flat sided pin on the hook, that is slots having a relatively wide end 28 and a narrow part 29 extending for the greater part of their length.

The locking member is further provided with an upwardly extending shank or connecting rod 30 which is pivoted to it at 31. The upper end of the rod 30 is provided with a slot 32.

The operating mechanism comprises a rod 35 arranged transversly at the end of the vehicle and mounted in suitable bearings 36 so that it can be turned on its own centre. The two ends of the rods are provided with crank like handles 37 and intermediate these ends the operating rod is provided with a double crank 38 having a crank pin 39 engaging in the slot 32 in the upper part of the connecting rod 30.

The slots 32 may be rather wider than the diameter of the pin carried by the crank or cranks of the operating rod.

In operation when in its locking position, the upper jaw 22 of the locking member virtually closes the opening 11 of the hook, and when in this position the narrow parts 29 of the slots in the locking member are slightly inclined to the vertical and substantially parallel with the flat sides of the pin 15 on the coupling hook.

Thus, if the coupling link 25 which is engaged with the hook should receive a jar causing it to strike the upper jaw of the locking member vertically upwards, then the locking member will not move into its released position, but will jam, owing to the fact that the narrow parts of its slots are not vertical.

The locking member is moved into its released position for uncoupling by turning the operating rod 35 causing the crank 38 thereon to lift the locking member. During this motion the locking member slides upwardly and when it reaches its unlocked position it is tilted about the centre of the flat sided pin 15, owing to the relative positions or alignment of the parts, causing the narrow parts of the slots in the locking member to move out of line with the flat sides of the pin. The locking member will thus be sustained in its released position until it is given a rocking movement to bring the sides of the narrow parts of the slots back into line with the flat side or sides of the pin on the hook.

During the unlocking movement of the locking member the lower jaws 23 thereof will automatically raise the coupling link off the point of the hook and either cause it to drop clear, or enable it to be pulled off by the separating of the vehicles. The operation of uncoupling is therefore completely effected by turning the operating rod on one of the vehicles, it being unnecessary to remove the coupling link by a second operation.

After unlocking and uncoupling in this manner, the operating rod is moved back into its original position, the pin carried by the crank 36 of the operating rod moving to the bottom of the slot 32 in the upper part of the shank of the coupling member without, however, tilting the coupling member or causing it to drop back into its locking position.

The locking member remains in its released position until the coupling link is again placed in the hook. When this occurs the weight of the coupling link acts upon the lower jaws or extensions 23 of the locking member and imparts a rocking movement to the locking member, causing the inner parts of the slots therein to move into line with the flat side or sides of the pin on the coupling hook so that the locking member now automatically drops into its locked position. It cannot be moved from this locked position by means of the coupling link but only by again operating the operating rod.

What I claim then is:—

1. In a vehicle coupling, the combination of a hook for receiving a coupling member, a locking member mounted on the hook, said locking member being movable into a lowered position in which the mouth of the hook is barred and into a raised position in which the mouth of the hook is left open, an extension on the locking member serving to raise the coupling member clear of the hook as the locking member moves to the raised position, a control disposed for operation from the side of the vehicle, and means for moving the locking member to the raised position and retaining it in the said position when a single movement is given to the control, said extension serving to displace the locking member from the raised position when a coupling member is placed in the mouth of the hook.

2. Coupling apparatus for vehicles, comprising a hook for receiving a coupling member; a locking member capable of sliding motion with respect to the hook either into a lowered position in which the mouth of the hook is barred or into a raised position in which the mouth of the hook is left open, said locking member being also capable of a limited pivotal motion when in the raised position, a guided mounting for the locking member serving to determine its sliding motion and also serving to prevent said sliding motion taking place when the locking member has been raised and pivoted, an extension on the locking member serving to raise the coupling member clear of the hook as the locking member is moved to the raised position, said extension also serving to reverse the pivotal movement of the locking member and allow it to fall to the lowered position when a coupling member is placed in the mouth of the hook while the locking member is raised and pivoted, a control mounted adjacent to the side of the vehicle, and an operating device connecting the control with the locking member and serving both to raise and pivot the locking member by a single movement of the control.

3. Coupling apparatus for vehicles, comprising a hook for receiving a coupling member; a locking member movable into a lowered position in which the mouth of the hook is barred and also movable into a raised position in which the mouth of the hook is left open; said locking member having a pin and slot mounting; the pin having a flat side; the slot being relatively narrow for the greater part of its length and having a relatively wide part at one end; the wide part of the slot allowing the locking member to pivot into a tilted position when raised so as to prevent the pin from entering the narrow part whereby the locking member is retained in the raised position and an extension on the locking member serving to raise the coupling member clear of the hook as the locking member is raised; said extension also serving, when a coupling member is placed thereon, to pivot the locking member into a position allowing the pin to enter the narrow part of the slot, whereby the locking member is caused to fall to the lowered position.

In witness whereof I affix my signature.

THOMAS FRANKS.